United States Patent [19]

Hopper

[11] 4,340,034

[45] Jul. 20, 1982

[54] SOLAR ENERGY COLLECTING APPARATUS

[76] Inventor: Thomas P. Hopper, Blue Hills Rd., Durham, Conn. 06422

[21] Appl. No.: 75,891

[22] Filed: Sep. 17, 1979

[51] Int. Cl.$^3$ .............................................. F24J 3/02
[52] U.S. Cl. .................................. 126/438; 126/439; 126/446; 126/449
[58] Field of Search ................ 126/438, 439, 446, 449

[56] References Cited

U.S. PATENT DOCUMENTS

| | | |
|---|---|---|
| 3,923,381 | 12/1975 | Winston . |
| 3,957,031 | 5/1976 | Winston . |
| 4,002,499 | 1/1977 | Winston . |
| 4,099,515 | 7/1978 | Schertz ................................ 126/438 |
| 4,099,516 | 7/1978 | Caulier ................................ 126/438 |
| 4,114,592 | 9/1978 | Winston . |
| 4,121,566 | 10/1978 | Radenkovick ...................... 126/438 |
| 4,132,510 | 3/1979 | Hare et al. ........................... 126/438 |

Primary Examiner—Larry Jones
Assistant Examiner—Wesley S. Ratliff, Jr.
Attorney, Agent, or Firm—Fitzpatrick, Cella, Harper & Scinto

[57] ABSTRACT

A solar energy collecting apparatus comprises an elongated, trough-like reflector for reflecting solar energy to an elongated focal region. The reflector, which partially defines an enclosed space, includes adjacent first and second portions that extend in mutually parallel relation, each portion including an inner reflective surface having a generally parabolic cross-sectional shape that comprises a vertex and opposing side walls diverging from the vertex. One of the side walls of the first portion intersects one of the side walls of the second portion and thereby defines a peak or cusp that projects inwardly of the enclosed space. An absorber is mounted in the focal region in spaced relation to the peak to receive solar energy directly incident thereon and reflected thereto by the reflector and comprises a tubular member for conducting a heat transferring medium therethrough. Two vanes are associated with the tubular member, each vane making an angle of less than 180° with the other. One vane projects to a position laterally adjacent and spaced from one side of the peak and the other projects to a position laterally adjacent and spaced from the other side of the peak so that no straight-line path is available for light between the peak and absorber. Accordingly the vanes block and absorb solar energy reflected from both the first and second portions of the reflector to the region between the peak and the absorber. A method of manufacturing this solar energy collecting apparatus is also disclosed.

18 Claims, 9 Drawing Figures

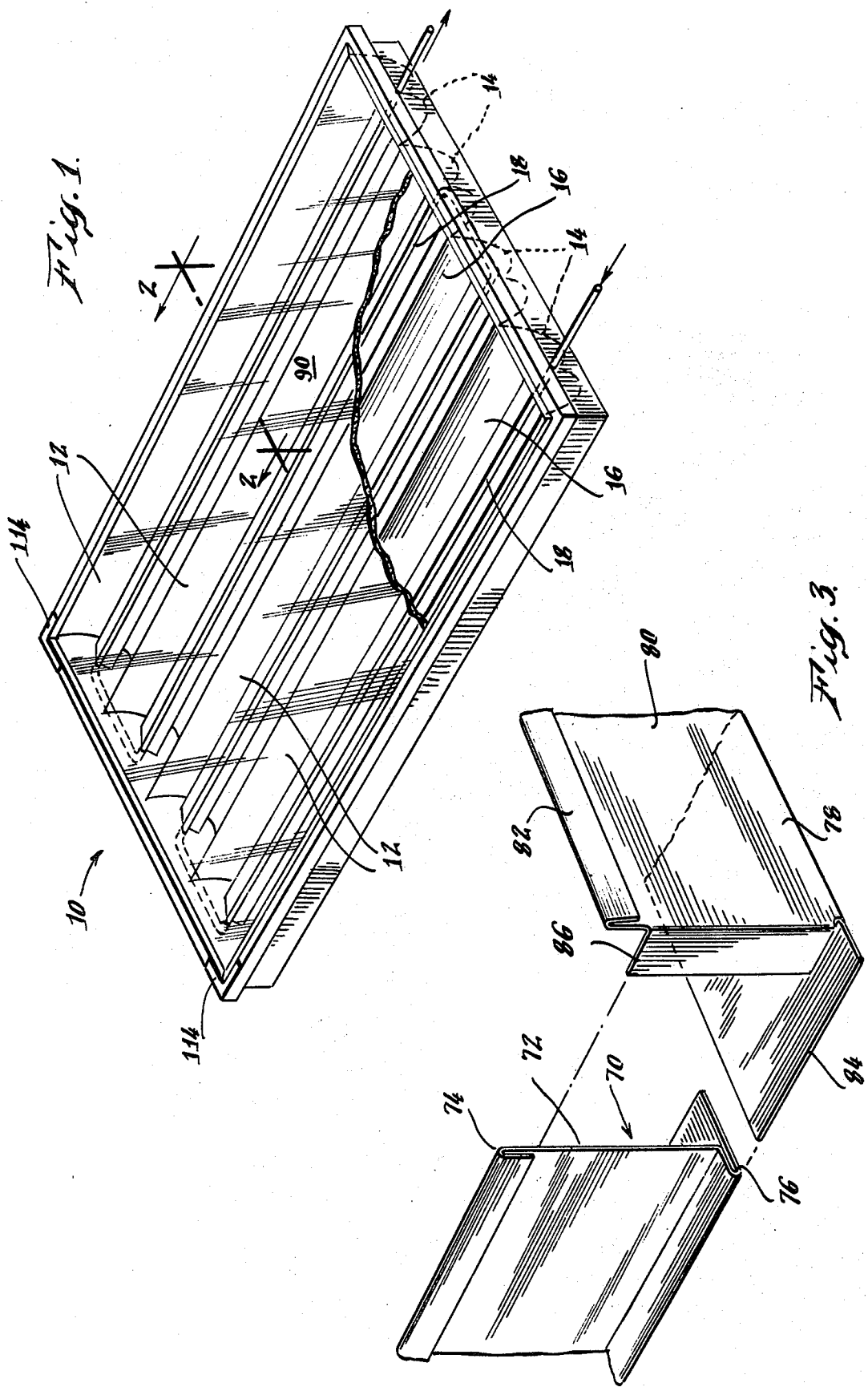

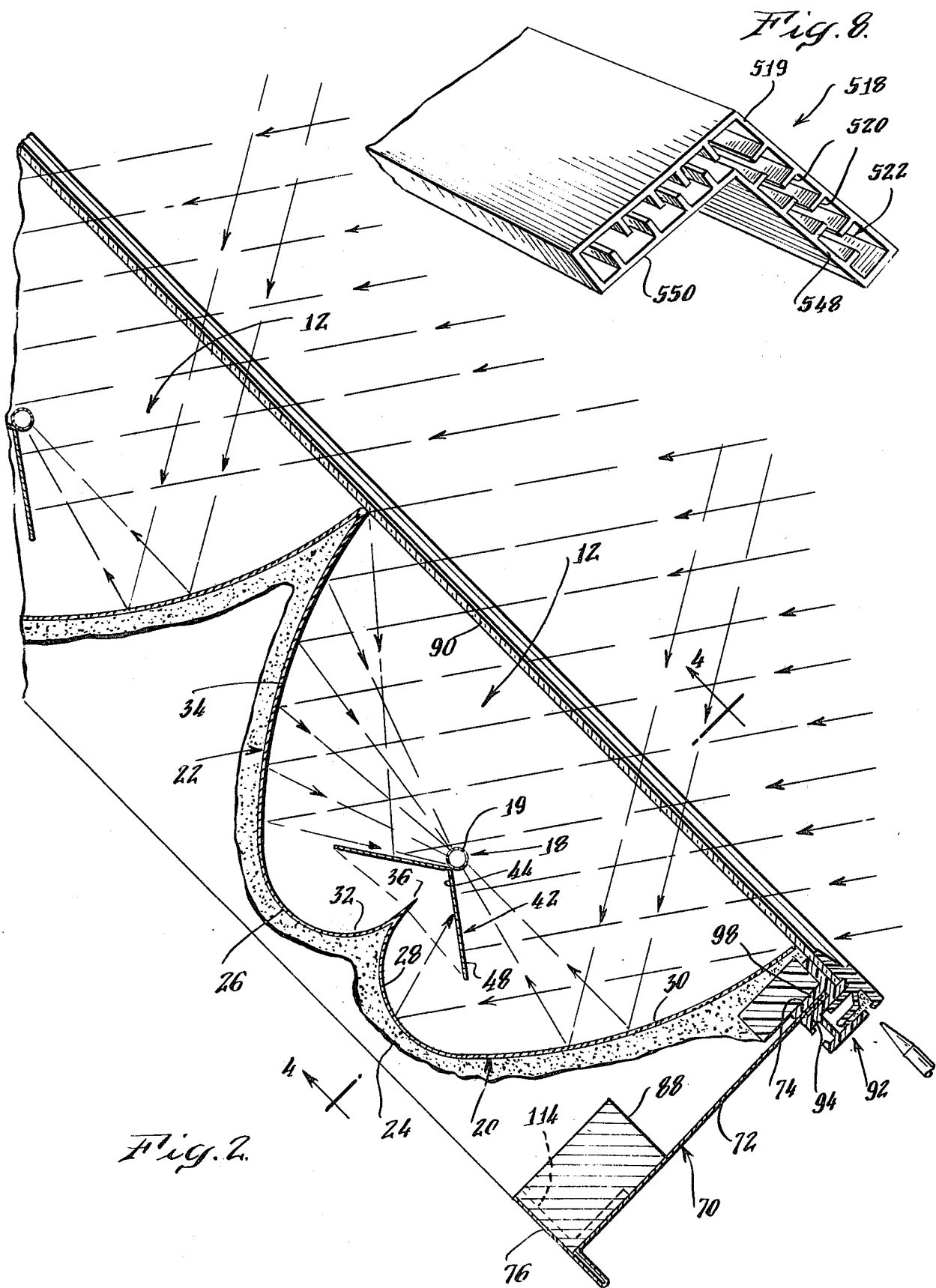

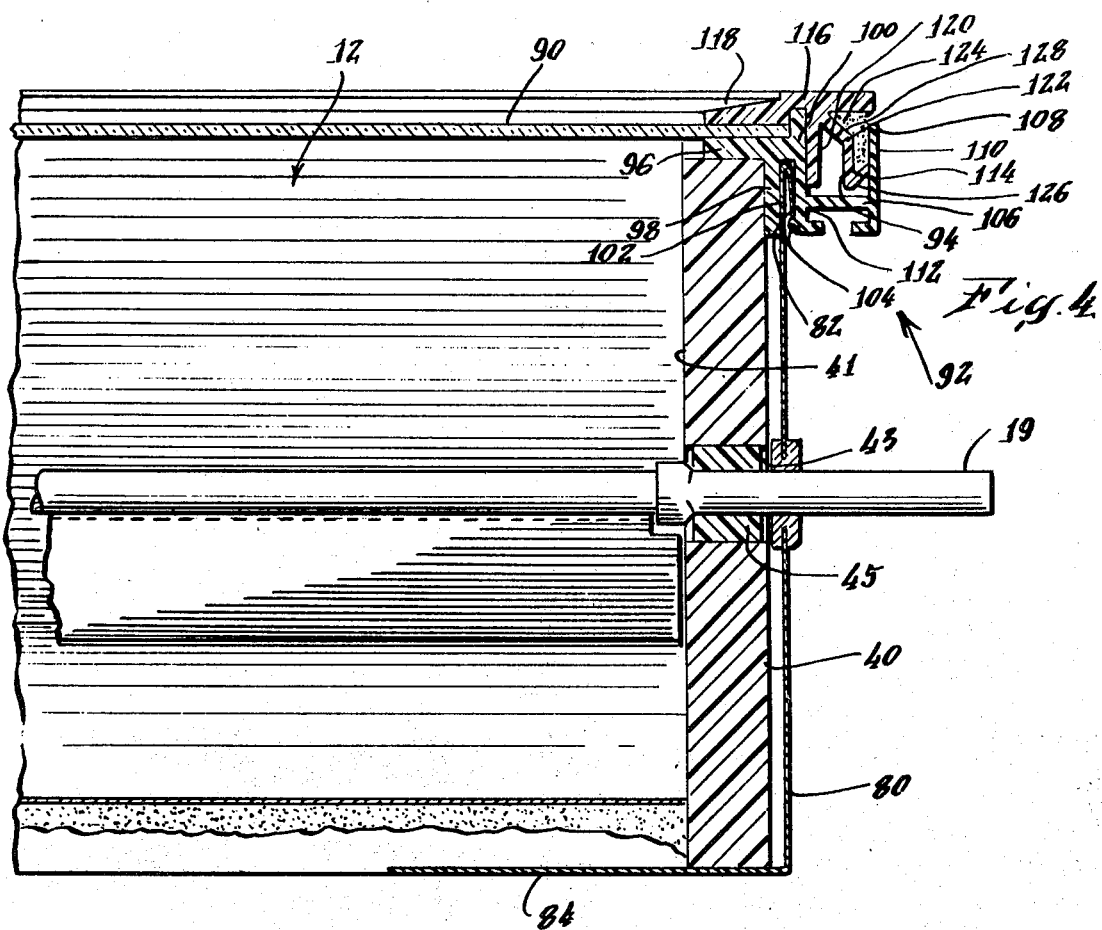
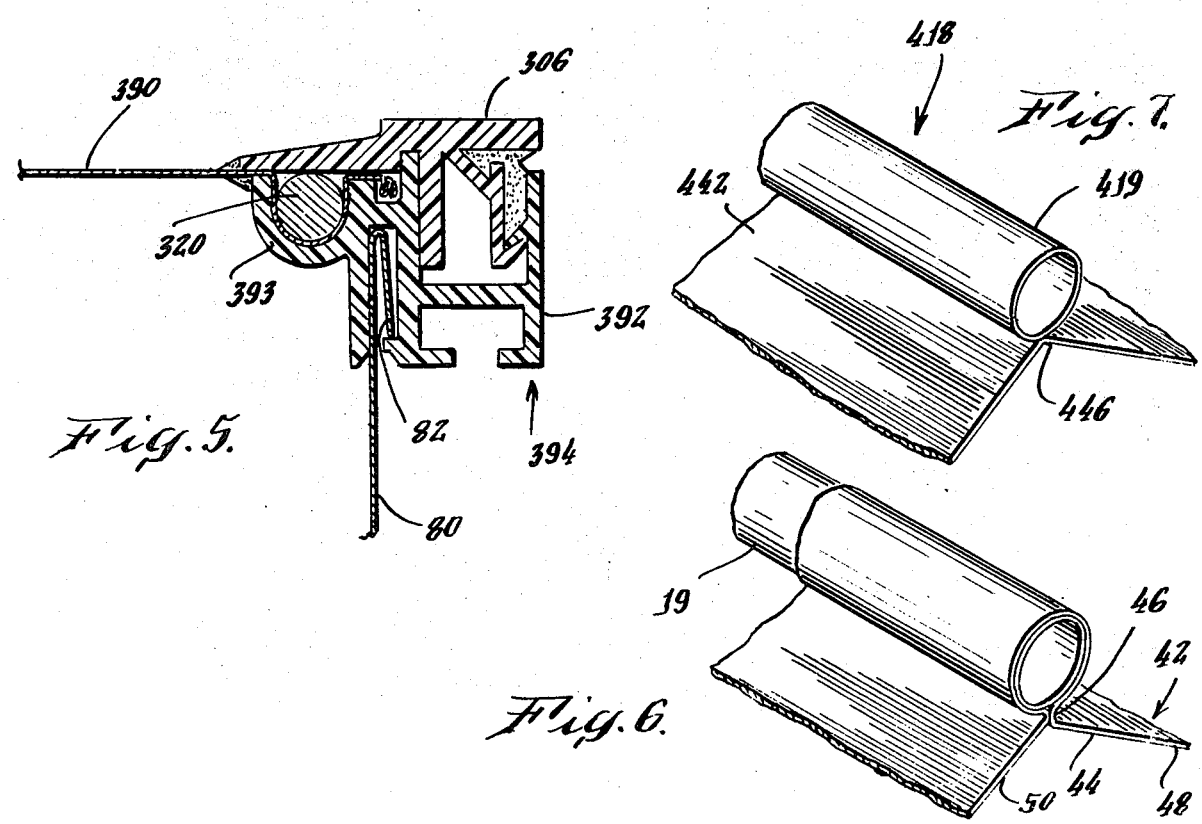

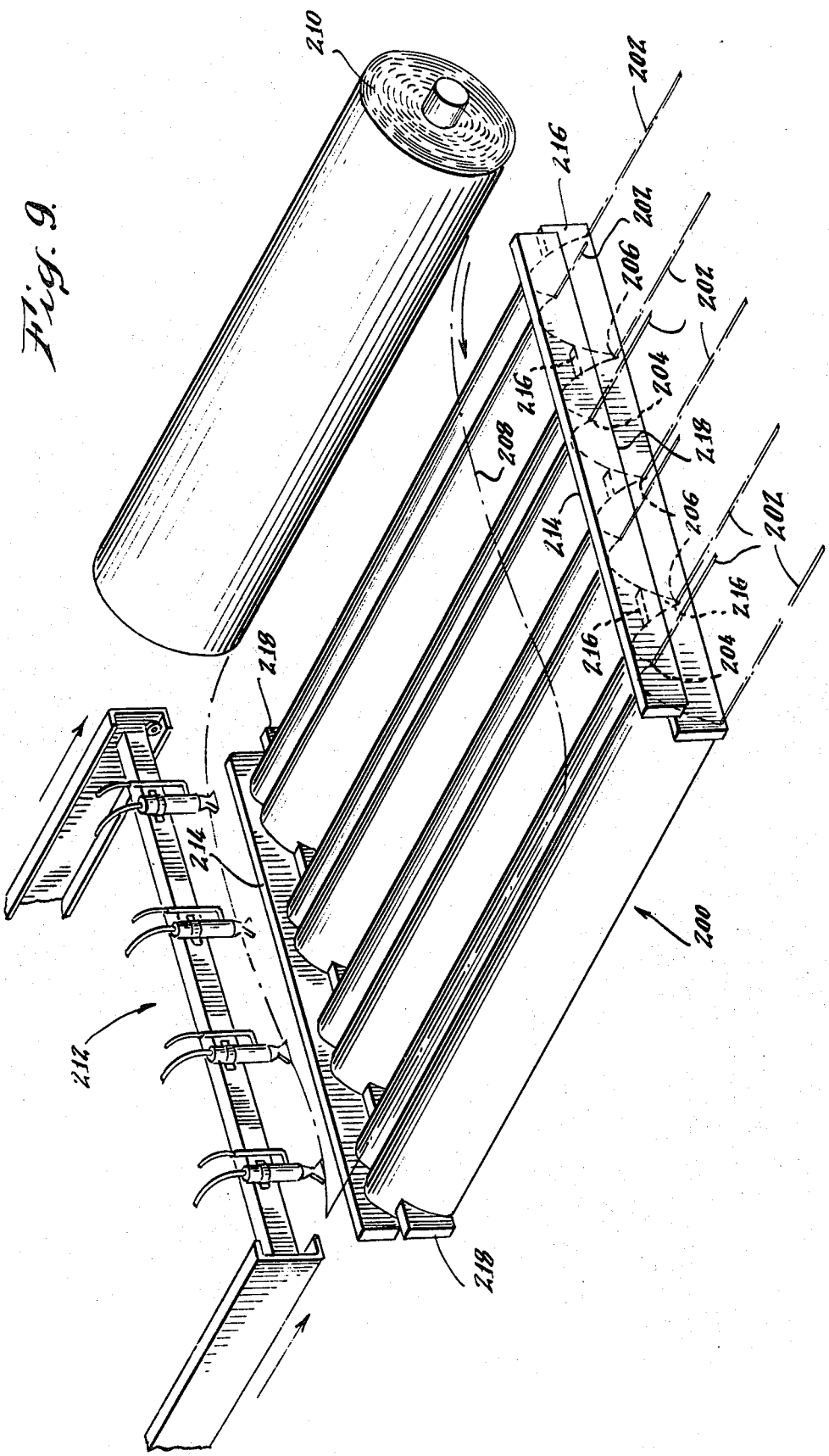

SOLAR ENERGY COLLECTING APPARATUS

BACKGROUND OF THE INVENTION

1. Field of the Invention

The present invention relates generally to solar energy collecting apparatus and specifically relates to the type of such collecting apparatus which concentrates solar energy on a focal region. Further, the solar energy collecting apparatus of the invention is preferably of the fixed type that does not change attitute with daily or seasonal positional changes of the sun.

Since reserves of fossil fuel resources are being depleted at increasing rates, greater emphasis is now being placed on effectively and efficiently collecting and using energy radiated from the sun. Solar energy is, for practical purposes, limitless. However, collecting solar energy in sufficient quantities to supply current needs has proven difficult.

Solar energy collecting systems are now most practically and economically used for water heating purposes but may be adapted to supply energy for other purposes such as space heating and air conditioning. Solar energy collecting apparatus used in such applications now usually fall into one of two basic categories. One such category comprises flat-plate solar energy collecting apparatus that employ an absorber having a flat surface provided with a black or selective coating that is capable of receiving clear or diffuse solar energy from a large range of angles without any provision for movement of the surface. The second category comprises concentrating solar energy collecting apparatus that employ reflective elements to focus solar energy on a focal region. Generally the temperature or grade of heat that may be derived from the solar energy collected with a concentrating collector is much greater than that achieved with flat-plate collectors.

2. Description of the Prior Art

Many forms of concentrating solar energy collecting apparatus have been proposed. Typically, such apparatus employ a reflector, which is often a parabolic or circular cylindrical mirror, that focuses solar energy on an absorber, which usually is a tube or assembly of tubes through which a heat conducting fluid may be conducted. Some concentrating solar energy collecting apparatus are designed to be fixedly mounted yet nevertheless reflect large amounts of solar energy to the absorber during a clear solar day. Examples of this type of apparatus are disclosed in U.S. Pat. Nos. 4,011,855 (Eshelman), 4,059,094 (Barrio de Mendoza), 4,024,852 (L'Esperance et al.), and 4,003,366 (Lightfoot).

Other concentrating collecting apparatus are designed to move in coordination with movement of the sun. This type of apparatus is said to "track" the sun and examples of it are disclosed in U.S. Pat. Nos. 4,026,273 (Parker), 4,058,110 (Holt), 4,011,858 (Hurkett), 4,038,972 (Orrison), 4,067,319 (Wasserman) and 4,077,392 (Garner).

Still other concentrating solar energy collectors are disclosed in "Solar Concentrating Collectors", Proceedings of the ERDA Conference on Concentrating Solar Collectors, Georgia Institute of Technology, Atlanta, Ga., Sept. 26-28, 1977. One such collector, disclosed in Cole, Allen, Levitz, McIntire, and Schultz, *Performance and Testing of a Stationary Concentrating Collector* delivered during the Proceedings (see pages 3-31 through 3-37) is called the Compound Parabolic Concentrator (CPC) because it employs a reflector having adjacent parabolic portions, adjacent side walls of which intersect at a peak or cusp. An absorber is mounted directly on the cusp. Problems with CPC collectors are discussed in Patton, *Design Considerations for a Stationary Concentrating Collector* (see pages 3-37 through 3-44) also delivered during the Proceeding.

Concentrating collectors are said to be either imaging or non-imaging, and both types may be oriented either in the north-south or east-west direction. Imaging collectors are only efficient when positioned nearly normally to incoming insolation while non-imaging collectors have a finite acceptance angle and insolation within that angle, including diffuse radiation, may be accepted. Imaging concentrating collectors must move to track the sun when installed in either orientation. Non-imaging concentrating collectors may be designed to track the sun but can be designed to be fixed when installed in the east-west orientation.

Generally, imaging concentrating collectors do not work effectively in diffuse light since much of the reflected energy necessarily misses the absorber target. Non-imaging concentrating collectors more efficiently collect energy from diffuse light than do imaging concentrating collectors by providing a larger absorber target for reflected energy, but are not as efficient in this regard as are flat-plate collectors.

Tracking collectors are capable of receiving solar energy from a large range of angles since they can "follow the sun". However, because they must be spaced so one collector unit does not adversely shade an adjacent unit, the ratio of net collector area to gross occupied surface area is comparatively low. Stationary solar energy collectors collect solar energy from a more limited range of acceptance angles than do tracking collectors, but do have the advantage of providing a high ratio of the net collector area to the gross surface area occupied by the entire collector apparatus since little adverse shading occurs. Therefore, stationary concentrating collectors make good use of available support space.

Whether of the tracking or stationary type, each of the concentrating solar energy collectors disclosed in the patents and papers noted above is characterized by certain inefficiencies in its design. Specifically, in some collectors, the absorber is mounted at a location spaced from and therefore out of contact wih the reflector. Examples of this configuration are shown in Lightfoot, Parker, Hurkett and Holt patents and in the CPC collector shown in the Patton paper. Therefore, at least some solar energy may be reflected by the reflector through the region between the absorber and the reflector, referred to as the gap or COR, to, in turn, be reflected back outwardly from the collector. A substantial amount of energy received by the reflector is not received by the absorber and cannot be used when such a cap or COR exists.

In other designs, the absorber is mounted directly on or is otherwise connected to the reflector. Examples of such an arrangement are shown in the L'Esperance et al., Barrio de Mendoza and Eshelman patents and in the CPC collector shown at the Cole et al. paper. Therefore, at least some of the energy that would have been reflected between the absorber and reflector in designs in which these components are separated is intercepted by the absorber or the members which connect the absorber to the reflector. However, heat generated in the absorber by the collected energy may be conducted back into the reflector through its direct or indirect contact with the absorber instead of being conducted away by a heat transferring medium for subsequent use. Therefore, a substantial amount of energy received by the collector is not utilized but is rather conducted inefficiently into the apparatus. Furthermore, rapid degradation of the surface of the reflector may be caused by this contact because the mounting member or absorber and the reflector are usually made from dissimilar materials and because of the high temperatures at which the absorber operates.

SUMMARY OF THE INVENTION

It is an object of the present invention to provide a concentrating solar energy collecting apparatus, which minimizes certain problems with known collectors, in which substantially all solar energy received is directly incident on or reflected to an absorber and not reflected back outwardly from the reflector. The absorber is mounted, nevertheless, in spaced relation from the reflector so that heat loss by conduction into the structure is minimized and degradation of the reflector surface caused by contact of it with a dissimilar material is eliminated.

It is a further object of the present invention to provide a solar energy collector that may be easily and economically made from inexpensive, readily available materials.

It is a further object of the present invention to provide a non-imaging concentrating solar energy collector that may be fixedly mounted to receive large amounts of solar energy throughout the solar day and throughout the solar year. However, certain of the principles embodied in the present invention may nevertheless be adapted for use in concentrating solar energy collectors that track movement of the sun.

It is still a further object of the present invention to provide a concentrating solar energy collector that may be easily maintained and that is designed to provide a high ratio of solar collector area to the total area occupied by solar collecting apparatus mounted on a supporting structure.

In the preferred embodiment, the concentrating solar energy collecting apparatus of the invention comprises an elongated trough-like CPC reflector for reflecting solar energy to an elongated focal region. The reflector has a reflective inner surface having a curved or generally parabolic cross-sectional shape. The reflective inner surface partially defines an enclosed space and is formed with an elongated peak that projects inwardly of the space.

More specifically, the reflector comprises adjacent, elongated first and second mutually parallel portions, each having an inner reflective surface with a curved or generally parabolic cross-sectional shape that defines a vertex and opposing side walls diverging from the vertex. One of the side walls of the first portion intersects one of the side walls of the second portion thereby defining the peak or cusp.

An absorber for receiving solar energy that is directly incident thereon and that is reflected from the reflector to the focal region includes a tubular member for conducting a heat transferring medium therethrough. The tubular member is mounted in spaced relation to the peak. Two vanes are associated in heat-conducting relation wih the tubular member, each vane making an angle of less than 180° with the other. A first of the vanes project to a position laterally adjacent and spaced from one side of the peak and a second of the vanes projects to a position laterally adjacent and spaced from the other side of the peak. The vanes block the path of reflected solar energy which ordinarily would be reflected through the gap or COR between the peak or other surface of the reflector and the tubular member.

The vanes and tubular member may be provided with a black or a selective coating on all surfaces so that these components efficiently absorb solar energy reflected thereto and directly incident thereon.

Accordingly, the solar energy collecting apparatus of the invention minimizes problems that have characterized prior art concentrating solar energy collectors. First, since the absorber is mounted in spaced relation to the reflector, undesirable conduction of heat from the absorber to the reflector is minimized. Second, the vane and peak construction of the absorber and reflector prevents passage of reflected energy through the gap between the absorber and reflector that would subsequently be reflected out of the collector and, therefore, lost. Third, the tube and vane construction provides an economic embodiment for the absorber. While its position allows an economic embodiment for the reflector.

The collector of the invention further incorporates a system for enclosing the reflector and absorber with a transparent cover so that degradation of the reflector and consequent loss of reflectivity due to the effects of weather are minimized. The cover is also designed to be easily removed for maintenance of the collecting apparatus.

Methods for producing low cost absorbers with the solar energy intercepting vanes and for manufacturing low cost reflectors are also provided by the invention.

Other objects, features and advantages of the present invention will be pointed out in or will be understood from the following detailed description provided below in conjunction with the accompanying drawings.

BRIEF DESCRIPTION OF THE DRAWINGS

FIG. 1 is a perspective view of solar energy collecting apparatus comprising a bank of concentrating solar energy collectors constructed in accordance with the present invention.

FIG. 2 is an enlarged vertical cross-sectional view taken through plane 2—2 in FIG. 1, illustrating the shape of the reflector and the placement of the absorber within the space partially defined by the reflector.

FIG. 3 is a perspective view of the corner of a frame assembly for supporting the reflectors and absorbers of the apparatus of the invention.

FIG. 4 is a vertical cross-sectional view taken through plane 4—4 in FIG. 2 showing an end panel assembly of the collecting apparatus.

FIG. 5 is an alternative embodiment of means for enclosing the space defined by the reflector.

FIG. 6 is a perspective view of one embodiment of the absorber illustrating one manner in which the vanes may be attached to the tubular member.

FIGS. 7 and 8 are perspective views, similar to FIG. 6, showing two other embodiments of the absorber member.

FIG. 9 is a diagrammatic perspective view of one method of forming a bank of reflectors for use in the solar energy collecting apparatus of the invention.

DETAILED DESCRIPTION OF THE PREFERRED EMBODIMENT

The solar energy collecting apparatus of the present invention is indicated generally at 10 in FIG. 1 and desirably comprises a plurality of individual concentrating solar energy collectors, each generally indicated at 12. The collectors are designed and made so that the total collector area exposed to the sun closely approaches the total area occupied by the collecting apparatus on its support structure. That is, the effective solar energy collecting area nearly equals the total area occupied by the collector apparatus and, according, the system is said to have a high "net collector area to gross surface area" ratio or more simply a high "net to gross" ratio. Moreover, each individual solar energy collecting device in the preferred embodiment is designed to be fixedly mounted in an east-west orientation for exposure to the sun and is designed to maximize acceptance of the solar energy, minimizing reradiation thereof, and to minimize undesirable conduction of heat and, therefore, heat loss from the components of the apparatus into associated structures. However, it is to be understood that certain principles of the present invention illustrated in the preferred embodiment may be adapted to tracking-type concentrating solar energy collectors that are mounted in a north-south orientation.

As can be seen in FIG. 1, each solar energy collecting device comprises a reflector 14 in the form of an elongated trough-like member having an inner reflective surface 16 that has a generally parabolic cross-sectional shape described in greater detail below. Each trough-like reflector member preferrably extends in an east-west direction lying parallel to the earth and is mounted on a support structure such as a roof that makes an appropriate slope with the earth. For example, a support structure slope of about 45° is appropriate for providing year round domestic hot water at about 40° north latitude. The reflector can be designed to concentrate and collect solar energy falling thereon within a range of 70°, for example, from 10 degrees above the horizon to 80° about the horizon on 40° north latitude.

The inner reflective surface of the trough-like member focuses solar energy on an elongated focal region within the space at least partially enclosed by the trough-like member. Each individual collector also includes an absorber generally shown at 18 mounted in the focal region within the trough-like reflector member to receive solar energy reflected thereto by the reflector as well as energy directly falling thereon. The absorber is heated by solar energy reflected to and directly falling on it, the heat being transferred to a heat conducting medium, usually a liquid, for subsequent transport to other apparatus for use.

As can be seen in greater detail in FIG. 2, the trough-like reflector member comprises two elongated portions 20 and 22, each having a curved or generally parabolic cross-sectional shape with a vertex 24 and 26 respectively. The first parabolic portion 20 has two opposing side walls 28 and 30 that diverge upwardly and outwardly from the vertex 24. The second parabolic portion 22 similarly has two side walls 32 and 34 that diverge upwardly and outwardly from the vertex 26. The side wall 28 of portion 20 intersects the side wall 32 of the portion 22 to thereby form a peak or cusp 36 that projects inwardly of the space partially enclosed by the reflector.

(For purposes of this Specification and the concluding claims the term "parabolic" is intended to mean or relate a structure that generally curved or bowl shaped in cross-section and is not intended to be limitative to the mathematical definition of the term parabolic.)

The cross-sectional shape of the reflector member is symmetrical about a plane extending through the peak 36 and the center of the absorber 18. Therefore, the collecting apparatus may be mounted on the support structure in an east-west orientation with the reflectors extending parallel to the earth but without further regard for proper up or down orientation.

In the preferred embodiment, the reflector member may comprise a low cost metalized plastic sheet, stamped, molded or roll-formed stainless steel or high grade aluminum or other suitable material that need not be of heavy gauge. If of a metalized plastic sheet, the reflector is reinforced by a layer of insulating material such as urethane foam. A method of forming a bank of low cost reflective members such as that described above is explained below in greater detail.

The first portion 20 of the reflector member constitutes a high angle summer parabolic inner reflecting surface for receiving and collecting solar energy during the summer months. Similarly, the second portion 22 of the reflector member constitutes a low angle winter parabolic inner reflecting surface for receiving solar energy from the sun during the winter. Of course both portions 20 and 22 may reflect solar energy to the absorber during any given solar day.

The absorber 18 comprises a tubular member in the form of a tube 19 that provides a conduit through which a heat conducting medium, such as water, freon or water containing an antifreeze component, may be circulated. The tube is desirably made of a copper pipe and is supported at both ends in spaced relation to the peak by end panels 40 mounted at the ends of the reflector member as shown in FIG. 4. In the preferred embodiment these end panels are of ¾ inch thick urethane insulation having a reflective foil surface 41 facing inwardly of the enclosed space defined partially by the reflector member. The panels 40 are formed with a hole 43 through which the tube 19 passes. A silicone insulating and spacer ring 45 positions the tube within the hole 43.

Referring again to FIG. 2 and as further shown in FIG. 6, the absorber further comprises a metal foil strip 42 that extends with the tube 19 and is wrapped around it. The foil strip has an inside surface 44 that, in being wrapped around the tube 19, confronts itself at one side 46 thereof. The strip is there joined together at the one side 46 to ensure that it is in intimate contact with the surface of the tube. It has been found that a mechanical bond using stainless steel staples secured through the foil in the region 46 of the confronting inner surface is effective in pulling the foil strip tightly about the tube to ensure intimate contact therewith. Alternatively the foil may be sewn or stitched on the tube.

The foil strip has sufficient width to further form two vanes 48 and 50 that project from the region 46 in which the strip is stapled together to define a V-shaped structure and thus from the tube 19 toward the surface of the reflector. The vanes 48 and 50 make an angle with one another of about 110°. The first vane 48 projects from the tubular member to a position laterally adjacent and spaced from one side of the peak 36. Similarly, the second vane 50 projects from the tubular member to a position laterally adjacent and spaced from the other side of the peak 36. Therefore, as can be seen in FIG. 2, no straight line path is available for reflected solar energy to pass through the gap between the tube and the peak because either one or both of the vanes will intercept such reflected energy.

FIG. 7 shows another embodiment of the absorber 418 which comprises a copper tube 419 to which a foil sheet 442 is welded in the region 446 by, for example, a process practiced by Thermatool Corporation, Stamford, Conn. Specifically, the foil sheet or strip 442 has a major axis and is continuously welded to the outer surface of the tube along a line parallel to the major axis. The tube 419 and foil sheet may also be joined with conductive solder, epoxy or other adhesives.

Still another embodiment of the absorber 518 is shown in FIG. 8. This embodiment, which is designed to conduct a gaseous rather than liquid heat conducting medium, comprises a V-shaped tubular member 519 that may be extruded, for example, from aluminum. A series of fins 520 may be formed on the inner surface of the tubular member and project inwardly into the enclosed space 522 defined thereby to improve heat conduction to the medium. The tubular member 519 itself forms two vanes 548 and 550. The absorber 518 is mounted in the focal region of the reflector with the vanes projecting to opposite sides of the peak 36 as described above.

In each embodiment of the absorber, the surfaces of the vanes and tubes are provided with a black chrome selective coating with high alpha valves and low epsilon valves to increase the efficiency with which it absorbs solar energy either directly falling on it or reflected to it.

It will be appreciated that all components of each embodiment of the absorber are mounted in spaced relation to the reflector member. Therefore, undesirable conduction of heat generated from the absorber to the reflector is avoided. The panels 40 that support the absorber at its ends insulate it from the supporting structure to further inhibit conductive heat losses.

The bank of solar energy collectors are supported in a housing such as that shown in detail in FIGS. 2, 3 and 4. The housing, which is preferrably made of sheet metal, includes side members 70 formed with a vertical web section 72, a roll-formed top edge 74 and a roll-formed bottom platform 76. Thus, as can be seen in FIG. 3, the side member 70 has the form of an inverted T-shaped member. The housing further includes end sections 78 formed with a web section 80 and a roll formed top edge 82 and a bottom panel 84 extending laterally from the bottom edge of the web section to form an L-shaped cross-section. As shown in FIG. 3, a tab 86 is formed at the end of the panel web section and is insertable along the web section 72 of the side panels. Similarly, the end of the bottom section 84 of the end panels is insertable into the roll formed portion of the bottom section 76 of the side panel 70. As shown in FIG. 2, the side panels are provided with a stiffening block 88 which may be either a wood block or metal angle. Similarly, the end panels of the reflector assembly are mounted adjacent and within the end section of the housing. A desiccant may be inserted between the end panel and the end portion of the housing to remove moisture from the air within the enclosed space.

As shown in FIG. 4, the solar energy collecting apparatus further comprises a transparent cover 90 that is desirably made of ⅛" thick tempered glass having swiped edges and having a low iron content for maximum light transmittance. The cover is supported by a frame assembly generally indicated at 92, which comprises extruded ultraviolet stable plastic or aluminum components. Specifically the frame assembly includes a lower frame member 94 formed with a flange 96 and two short panels 98 and 100 depending therefrom, one 100 of which also projects upwardly therefrom. The panels together define a slot 102 into which the roll-formed upper edges 72 and 82 of the housing side and end members may be inserted. The panel 100 defines a shoulder 104 projecting inwardly of the slot 102 at its lower margin that engages the free edge of the roll-formed upper edges of the housing members to prevent relative disengagement.

An intermediate floor 106 projects sidewardly from the panel 100 and an end wall 108 is formed at the side margin of the floor projecting upwardly and downwardly therefrom. With panel 100 end wall 108 defines a U-shaped channel 110 above the floor 106 and a T-shaped channel 112 below the floor 106. A downwardly canted tape 114 is formed on the inner surface of the wall 108.

The frame assembly 92 further comprises a closure member 116 formed with a top section 118 having two legs 120 and 122 depending therefrom that interfit with the channel 110 to mount the closure and lower frame member together. When so mounted the top section 118 confronts the flange 96 to confine with the upwardly projecting portion of the panel 100, the edge of the cover 90.

One of the legs 122 is V-shaped in cross-section and is joined at one extreme to the cover section 118 adjacent the location at which other leg 120 is joined thereto. According a slot 124 is defined between the underside of the top section 116 and the vertex 128 of the V-shaped leg 122. An upwardly outwardly canted tab 126 is formed at the other margin of the V-shaped leg 122 and is adapted to snap fit with the tap 114.

The closure member 116 may be removed form the lower frame member 94 to permit removal of the cover 90 by wedging a tool such as a screwdriver into slot 124 and flexing the V-shaped leg to disengage the tabs 114 and 126.

Accordingly no screws are required to anchor the closure member to the lower frame member in order to mount the cover.

The flange 96 and top section 116 of the frame and cover members respectively may be extruded with soft plastic moisture seals, of material different from the remaining frame assembly, to prevent infiltration of moisture into the space enclosed by the collector.

The extruded members are mitered at the corners of the solar energy collecting apparatus. Further, the T-shaped channel 112 of the lower frame member may receive a steel reinforcing angle 114 at the corners of the housing to complete assembly of the frame structure (see FIGS. 1 and 4).

An alternative embodiment of the cover for the collector apparatus is shown in FIG. 5. This embodiment includes a lower frame member 394 formed with a cylindrical channel 393, in place of the flange 96, projecting inwardly of the collector apparatus. A clear, thin sheet cover 390 may be used as the transparent cover and for example, may be three mil thick polytetrafluoroethylene, sold under the trademark "TEFLON" by E. I. duPont de Nemours & Co. The sheet is pulled tightly and held within the lower frame member by a rod 320 that is press fitted into the channel 393. In all other respects the lower frame member and closure members 394 and 306 respectively are the same as that described with reference to FIG. 4. This structure then is of light weight for applications where weight is an important consideration.

As can be seen in FIG. 1 in the preferred embodiments, each bank of solar energy collectors forming the apparatus of the present invention includes an even number of such collectors. The tubular members of the absorbers in adjacent collectors are connected in series to reduce overall construction cost. Accordingly, the inlet and outlet from the serially collected absorbers may be on the same side of the entire collector apparatus to make subsidiary piping more simple. However, if desired the tubular members can be connected in parallel to improve performance.

FIG. 9 shows apparatus for manufacturing banks of collector members rapidly at low cost. This apparatus includes a form 200 for four such reflector panels. This form may be provided with a vacuum apparatus to pull a sheet of metalized film tightly down thereon and/or may be provided with tightening strings 202 to pull a sheet into the regions 204 of the peak formed at the center of each collector and the peak regions 206 formed between adjacent reflector members. Apparatus is provided for placing a sheet 208 supplied from a supply roll 210 in contact with the upper surface of the form. The sheet is then tightly pulled into contact with the surface of the form by vacuum or using the tightening strings or both. Then a urethane foam spray rack 212 is translated over the now formed reflector material and urethane foam is sprayed onto the back surface thereof. The rack is returned to its rest position shown in FIG. 8 and the urethane foam is allowed to cure. Once cured, the reflector units may be removed from the form for subsequent assembly with the components of the apparatus described in detail above.

As shown in FIG. 9, the forming process may further include mounting of a urethane foam block 214 having a height sufficient to appropriately position the tubular members of the absorbers along the side surfaces of the reflector foam 200. Triangular members 216 are positioned between adjacent reflector members to fill the space between the upper margin 218 of the block 214 and the peaked region 216 of the adjacent reflector panels. The urethane foam is then applied in such a manner that when cured it will secure the urethane block and triangular members to the finished assembly. When the assembly is removed from the form, the absorber members may be supported on the urethane foam block 214 and a second block mounted on top thereof to secure the final position of the absorber at the appropriate location.

Accordingly, although preferred embodiments of the solar energy collecting apparatus and methods of making its various components have been disclosed in detail above, this is for purposes of illustration. Modifications may be made to this apparatus and method of making it in order to adapt it to particular applications.

What is claimed is:

1. An apparatus for collecting solar energy comprising:
    elongate reflector means defining an elongate focal region and having a reflective inner surface, which is generally parabolic in cross-section, for reflecting solar energy to said focal region, said inner surface further partially defining an enclosed space and being formed with an elongate peak which projects inwardly of said enclosed space and divides said inner surface into first and second portions extending in mutually parallel relation; and
    absorber means for receiving solar energy directly incident thereon and reflected thereto by said inner surface of said reflector means and from which heat generated by said received energy may be conducted, said absorber means being mounted in said focal region spaced from said reflector means and including vane means comprising a pair of vanes each having an elongate extreme free end and projecting to a position with said free end adjacent and spaced laterally from one side of said peak, said free ends of said vanes extending in generally mutually parallel relation to define a plane therebetween, said absorber means further being mounted in said focal region with said peak intersecting said plane whereby all straight line paths from the free end of one said vane to the free end of the other said vane are obstructed by said peak; whereby all straight line paths of energy reflected from one of said portions of said inner surface to the region between said peak and said absorber means toward the other of said portions are also obstructed; and whereby such reflected energy is incident on said absorber means and prevented from being reflected out of said apparatus.

2. An apparatus for collecting solar energy comprising:
    elongate, trough-like reflector means defining an elongate focal region and including adjacent, elongate first and second portions extending in mutually parallel relation that together partially define an enclosed space, each portion having a generally parabolic reflective inner surface for reflecting solar energy to said focal region and defining a vertex and opposing side walls diverging from said vertex, one of said side walls of said first portion intersecting one of said side walls of said second portion thereby defining a peak projecting inwardly of said enclosed space; and
    absorber means for receiving solar energy directly incident thereon and reflected thereto by said inner surfaces of said portions of said reflector means and from which heat generated by said received energy may be conducted, said absorber means being mounted in said focal region in spaced relation to said reflector means and including a tubular member for conducting a heat-conducting medium therethrough and vane means associated in heat conducting relation with said tubular member, said vane means including a pair of vanes each having an elongate extreme free end and projecting to a position with said free end adjacent and spaced laterally from one side of said peak, said free ends of said vanes extending in generally mutually parallel relation to define a plane therebetween, said absorber means further being mounted in said focal region with said peak intersecting said plane whereby all straight line paths from the free end of one said vane to the free end of the other said vane are obstructed by said peak; whereby all straight line paths of energy reflected from one of said portions by the inner surface thereof to the region between said peak and said absorber means toward the other of said portions are also obstructed; and whereby such reflected energy is incident on said absorber means and prevented from being reflected out of said apparatus.

3. The apparatus for collecting solar energy as claimed in claim 1 or 2 wherein said absorber means is provided with a selected coating on all surfaces.

4. The apparatus for collecting solar energy as claimed in claim 1 or 2 wherein absorber means comprises a V-shaped tubular member which also forms said two vanes that comprise said vane means.

5. The apparatus for collecting solar energy as claimed in claim 4 wherein said V-shaped tubular member is formed with fins projecting inwardly into the interior thereof.

6. The apparatus for collecting solar energy as claimed in claims 1 or 2 wherein said two vanes form an elongated structure having a generally V-shaped cross-sectional shape and are spaced apart by an angle of about 110 degrees.

7. The apparatus for collecting solar energy as claimed in claims 1 or 2 further comprising thermal insulating means disposed on the surface of said reflector means opposite the reflective surface thereof.

8. The apparatus for collecting solar energy as claimed in claims 1 or 2 wherein said generally reflective surfaces of said first and second portions of said reflector member are symmetrical about a plane passing through said peak.

9. The apparatus for collecting solar energy as claimed in claims 1 or 2 further comprising end panels of insulating material mounted at opposite ends of said reflector means for further enclosing said space and for supporting said absorber means therein.

10. The apparatus for collecting solar energy as claimed in claim 2 comprising a plurality of said trough-like reflector means mounted in side-by-side mutually parallel relation and wherein said tubular member mounted in each trough-like reflector means is connected in series with said tubular member mounted in the adjacent trough-like reflector means.

11. The apparatus for collecting solar energy as claimed in claim 10 comprising an even plurality of trough-like reflector means, said tubular member in each of said reflector means mounted at opposite extremes of said apparatus providing an inlet and an outlet to a supply and return of said heat-conducting medium, said inlet and outlet thereby being on the same side of said apparatus.

12. The apparatus for collecting solar energy as claimed in claim 2 wherein said tubular member comprises a tube and wherein said vane means comprises said two vanes, one of which projects from said tube to a position laterally adjacent and spaced from one side of said peak and the other of which projects from said tube to a position laterally adjacent and spaced from the other side of said peak.

13. The apparatus for collecting solar energy as claimed in claim 12 wherein said two vanes comprise an elongated strip, having a major axis, continuously welded to the outer surface of said tube along a line parallel to said major axis.

14. The apparatus for collecting solar energy as claimed in claim 12 wherein said two vanes comprise an elongated foil strip tightly wrapped about said tube in intimate contact therewith, one face of said strip confronting and being joined to itself in a region at one side of said tube, said vanes projecting from the region at said one side of said tube.

15. The apparatus for collecting solar energy as claimed in claim 14 further comprising staple means for joining said strip to itself in said region at said one side of said tube member.

16. The apparatus for collecting solar energy as claimed in claim 14 further comprising stitch means for joining said strip to itself in said region at said one side of said tube.

17. The apparatus for collecting solar energy as claimed in claim 2 further comprising transparent cover means spanning the distance between the other of said side walls of said first portion of said reflector means and the other of said side walls of said second portion, to further enclose said enclosed space.

18. The apparatus for collecting solar energy as claimed in claim 17 wherein said absorber means is mounted in said enclosed space, spaced from both said peak and said transparent cover means.

* * * * *